United States Patent
Swarup et al.

(10) Patent No.: US 6,169,150 B1
(45) Date of Patent: Jan. 2, 2001

(54) COATING COMPOSITIONS WITH DICARBOXYLIC HALF ESTER CONTAINING POLYMERS AND POLYANHYDRIDE CURING AGENTS

(75) Inventors: Shanti Swarup, Hampton Township; Joseph M. Carney, Reserve Township; Bruce A. Connelly, West Deer Township, all of PA (US)

(73) Assignee: PPG Industries Ohio, Inc., Cleveland, OH (US)

(*) Notice: Under 35 U.S.C. 154(b), the term of this patent shall be extended for 0 days.

(21) Appl. No.: 09/203,469

(22) Filed: Dec. 2, 1998

(51) Int. Cl.$^7$ ............... B32B 15/08; C08L 33/14; C08L 63/02
(52) U.S. Cl. ............... 525/533; 428/418; 428/458; 428/461; 428/463; 525/117; 525/170; 525/207; 525/454; 525/533
(58) Field of Search ............... 525/533, 454, 525/117, 170, 207; 428/418, 458, 461, 463

(56) References Cited

U.S. PATENT DOCUMENTS

| | | | |
|---|---|---|---|
| 3,306,883 | 2/1967 | Ravve et al. | 260/78.5 |
| 3,781,380 | * 12/1973 | Labana et al. | |
| 3,819,562 | 6/1974 | Cargagna | 260/33.4 |
| 3,864,316 | * 2/1975 | Robinson | 525/119 |
| 3,922,253 | 11/1975 | Jerabek et al. | 260/77.5 |
| 4,001,156 | 1/1977 | Bosso et al. | 260/29.2 |
| 4,031,050 | 6/1977 | Jerabek | 260/29.2 |
| 4,051,088 | * 9/1977 | Gibson | |
| 4,148,772 | 4/1979 | Marchetti et al. | 260/29.2 |
| 4,324,715 | 4/1982 | Emerick | 523/400 |
| 4,468,307 | 8/1984 | Wismer et al. | 204/181 |
| 4,711,917 | 12/1987 | McCollum et al. | 523/400 |
| 4,931,157 | 6/1990 | Valko et al. | 204/181.7 |
| 4,931,509 | 6/1990 | Yagishita et al. | 525/208 |
| 5,306,567 | 4/1994 | Kuo et al. | 428/482 |
| 5,498,685 | 3/1996 | Carlson et al. | 528/71 |
| 5,686,218 | * 11/1997 | Liebermann et al. | 430/109 |

FOREIGN PATENT DOCUMENTS

| | | |
|---|---|---|
| 159668 | * 1/1975 | (CS). |
| 37 11 791 | 10/1987 | (DE). |
| 0 251 921 | 1/1988 | (EP). |
| 711 592 | 7/1954 | (GB). |
| 63-030569 | 2/1988 | (JP). |
| 63-135430 | * 6/1988 | (JP). |
| 63-137969 | * 6/1988 | (JP). |
| 85 04666 | 10/1985 | (WO). |
| 92 19660 | 11/1992 | (WO). |
| 93 03094 | 2/1993 | (WO). |
| 94 27740 | 12/1994 | (WO). |

* cited by examiner

Primary Examiner—Robert E. L. Sellers
(74) Attorney, Agent, or Firm—Dennis G. Millman

(57) ABSTRACT

Coating compositions comprised of (a) a carboxyl functional adduct which is the reaction product of (i) a compound, polymer or oligomer containing pendant and/or terminal hydroxyl or epoxy functional groups and (ii) tartaric acid, malic acid, adipic acid, succinic acid, or anhydrides of said acids; and an anhydride curing agent are disclosed. The coating compositions have accelerated tack-free times and enhanced adhesion to zinc-coated steel and cold rolled steel without the use of a chrome containing wash primer.

7 Claims, No Drawings

COATING COMPOSITIONS WITH DICARBOXYLIC HALF ESTER CONTAINING POLYMERS AND POLYANHYDRIDE CURING AGENTS

CROSS-REFERENCE TO RELATED APPLICATIONS

This application is related in subject matter to commonly assigned U.S. patent application Ser. No. 08/720,937, filed Oct. 4, 1996, now abandoned, and U.S. patent application Ser. No. 08/928,533, now U.S. Pat. No. 5,891,960, which disclose citric acid containing polymers for enhancing adhesion of coating compositions, and U.S. patent application Ser. No. 09/145,691, filed Sep. 2, 1998, now U.S. Pat. No. 6,084,036, which discloses the use of citric acid polymers in an anhydride cured coating, optionally with the addition of a polyisocyanate. These applications, like the present invention, deal with improving adhesion of coatings to metal.

BACKGROUND OF THE INVENTION

The present invention relates to curable coating compositions, more particularly to coating compositions that are curable at low or ambient temperatures.

The present invention involves improvements that are particularly applicable to automotive refinish coatings, but will have utility in others areas as well, where adhesion of coatings to bare metal is a concern. When repairing a defect in the original coating of an automobile may involve sanding or grinding out a defect by mechanical means, or completely stripping an entire part or the whole vehicle of its original coating layers. This sanding or grinding typically results in bare metal being exposed, which usually requires coating with a primer composition prior to a finish coating being applied to the repaired area.

Automotive body parts are sometimes made of cold-rolled steel and/or steel which has been surface-treated with a zinc containing material (e.g., galvanized or galvanealed). Adhesion of coating compositions to these zinc coated steel substrates can be problematic. Attempts to modify coating compositions to improve adhesion to zinc-containing surfaces sometimes been found to cause adhesion to cold-rolled steel to be impaired. One approach to this adhesion problem involves the use of chrome-containing wash primers prior to application of the primer. This undesirably entails an additional step in the refinish painting process. Furthermore, chrome containing materials may require special handling for environment purposes.

Because of these shortcomings in the prior art approaches, it would be desirable to provide coating compositions that exhibit enhanced adhesion to cold rolled steel as well as to galvanized and galvanealed steel substrates without requiring the use of chrome-containing wash primers.

A coating composition that attains the objective of adhesion to cold rolled and zinc treated steel is disclosed in the aforesaid U.S. patent application Ser. No. 08/720,937, abandoned, and U.S. patent application Ser. No. 08/928,533, U.S. Pat. No. 5,891,960. The coating composition is comprised of a film forming polymer which is the reaction product of (a) a polymer or compound containing pendant and/or terminal hydroxyl or epoxy functional groups and (b) citric acid or citric acid anhydride. These coating compositions are disclosed as employing polyisocyanate or aminoplast type curing agents. For automotive refinish applications that usually require curing at ambient temperatures, the polyisocyanate curing agents are typically employed.

Further improvements have been sought in these citric acid-containing coating compositions. In particular, attempts have been made to shorten the length of time required for the applied coating to become "tack-free" (i.e., the time required before the coating may be sanded). The ability to sand a primer coating as soon as possible after application is an important consideration in optimizing the productivity of automotive refinishing operations. Such an improvement is the subject of the aforesaid U.S. patent application Ser. No. 09/145,691, wherein it is disclosed that shortened tack-free times of citric acid-containing coating compositions can be attained by using anhydride curing agents in place of the polyisocyanate curing agents. The use of the anhydride curing agent was found to accelerate tack-free times while maintaining adhesion to zinc treated steel substrates without the need for chrome containing wash primers. To maintain the desired adhesion to cold-rolled steel substrates, it was found desirable to include a polyisocyanate in addition to the anhydride curing agent.

It would be desirable to provide the short tack-free times of the anhydride cured coatings and also maintaining adhesion to both zinc treated steel and cold rolled steel without the need for a polyisocyanate.

SUMMARY OF THE INVENTION

It has now been discovered that an anhydride curable coating composition can be provided with accelerated tack-free times as well as good adhesion to both cold-rolled steel and zinc treated steel substrates without the use of a chrome-containing wash primer. The coating compositions of the present invention are comprised of (a) an adduct containing carboxyl groups and (b) an anhydride curing agent. The adduct (a) is the reaction product of (i) a compound, polymer or oligomer containing pendant and/or terminal hydroxyl or epoxy groups, and (ii) a material selected from the group consisting of tartaric acid, malic acid, adipic acid, succinic acid, and anhydrides thereof, wherein the carboxyl group of the adduct is in a terminal and/or pendant position and is derived from the reaction of the hydroxyl groups with the acid or anhydride and/or the reaction of the epoxy groups with the acid or anhydride. Advantageously, no isocyanate-containing curing agent is needed in this composition to attain the desired adhesion properties.

Compositions containing adduct (a) made from each of tartaric acid, malic acid, adipic acid, succinic acid exhibited some improved adhesion under certain conditions compared to a composition containing no such adduct, but overall, those made from tartaric acid were clearly superior to the others. All four acids, when incorporated into the adducts described above, improved adhesion to both cold rolled and electrogalvanized steel under dry conditions, although adhesion to cold rolled steel was best with the tartaric acid embodiment. When tested after exposure to humidity, the tartaric acid embodiment was superior to the other three acids in adhesion to both cold rolled and electrogalvanized steel. After humidity exposure, the malic, adipic, and succinic acid embodiments showed some improvement in adhesion to electrogalvanized steel but not as much as the tartaric acid embodiment (the improvement for adipic was slight). There was some improvement in adhesion to cold rolled steel after humidity exposure for the adipic acid embodiment (but not as much as for tartaric acid), slight improvement for the succinic acid embodiment, and a reduction in adhesion for the malic acid embodiment. Thus, for refinishing automobiles and other applications where the cured coating must withstand a wide range of conditions, the tartaric acid embodiment is uniquely qualified. In view of the structural similarity of all four of these acids, the superiority of tartaric acid is unexpected.

In addition to curable coating compositions, the present invention also encompasses the cured coatings resulting therefrom, as well as articles (especially metallic substrates) carrying the cured coating.

DETAILED DESCRIPTION OF THE INVENTION

In making the adduct (a) containing carboxyl groups in accordance with the present invention, reactant (i), a compound, polymer or oligomer containing pendant and/or terminal hydroxyl or epoxy functional groups, is reacted with a dicarboxylic acid reactant (ii). Reactant (i) may be selected from a variety of materials, examples of which include polyepoxides, acrylic polymers containing epoxy or hydroxyl groups, polyester polymers containing epoxy or hydroxyl functional groups, and oligomers containing epoxy or hydroxyl groups.

The polyepoxides used as reactant (i) in the practice of the present invention may be saturated or unsaturated, cyclic or acyclic, aliphatic, alicyclic, aromatic or heterocyclic as are known to those skilled in the art. Also, the polyepoxides may contain substituents such as halogen, hydroxyl, and ether groups. Examples of polyepoxides are those polymers having a 1,2-epoxy equivalency greater than one and preferably about two, that is, polyepoxides which have on an average basis two epoxy groups per molecule as are well known in the art. Preferred polyepoxides are polyglycidyl ethers of cyclic polyols. Particularly preferred are polyglycidyl ethers of polyhydric phenols such as bisphenol A. These polyepoxides can be produced by etherification of polyhydric phenols with epihalohydrin or dihalohydrin such as epichlorohydrin or dichlorohydrin in the presence of alkali. Examples of polyhydric phenols are 2,2-bis(4-hydroxyphenyl)propane, 1,1 -bis(4-hydroxyphenyl)ethane, 2-methyl-1,1-bis(4-hydroxyphenyl)propane,2,2-bis(4-hydroxy-3-tertiarybutylphenyl)propane, bis-(2-hydroxynaphthyl)methane, 1,5-dihydroxy-3-naphthalene or the like.

Besides polyhydric phenols, other cyclic polyols can be used in preparing the polyglycidyl ethers of cyclic polyol derivatives. Examples of other cyclic polyols would be alicyclic polyols, particularly cycloaliphatic polyols, such as 1,2-cyclohexanediol; 1,4-cyclohexanediol; 1,2-bis (hydroxymethyl)cyclohexane; 1,3-bis(hydroxymethyl) cyclohexane; and hydrogenated bisphenol A.

Further examples of polyepoxide polymers that may be used as reactant (i) are shown in U.S. Pat. Nos. 4,711,917 (columns 5–8); 4,031,050 (columns 3–5); and 3,922,253 (columns 1–2). The epoxide equivalent weight of the polyepoxide may generally range from 100 to about 2000 and preferably from about 180 to 500. Epoxy group-containing acrylic polymers such as those described in U.S. Pat. No. 4,001,156 (columns 3–6) can also be used as reactant (i).

Chain-extended polyepoxide polymers may also be used as reactant (i) and are preferred. Generally, chain extension can be carried out by reacting together a polyepoxide and a polyhydroxyl group-containing material (i.e., through hydroxyl-15 epoxy reaction) to chain extend or build the molecular Examples of alcoholic hydroxyl group-containing materials that may be used to chain extend the polyepoxides include simple polyols such as neopentyl glycol, polyester polyols such as those described in U.S. Pat. No. 4,148,772; polyether polyols such as those described in U.S. Pat. No. 4,468,307; and urethane diols such as those described in U.S. Pat. No. 4,931,157. Examples of phenolic hydroxyl group-containing materials that may also be used for this purpose include polyhydric phenols such as bisphenol A, phloroglucinol, catechol, and resorcinol. Mixtures of alcoholic hydroxyl group-containing materials and phenolic hydroxyl group-containing materials may also be used.

Optionally, chain extension of the polyepoxides can be achieved by means of a polycarboxylic acid material, preferably a dicarboxylic acid. Useful dicarboxylic acids include acids having the general formula: HOOC—R—COOH, where R is a divalent moiety that is substantially unreactive with the polyepoxide. R can be a straight chain or a branched alkylene or alkylidene moiety normally containing from 2 to 42 carbon atoms. Some examples of suitable dicarboxylic acids include adipic acid, 3,3-dimethylpentanedioic acid, benzenedicarboxylic acid, phenylenediethanoic acid, naphthalenedicarboxylic acid, pimelic acid, suberic acid, azelaic acid, sebacic acid and the like. Additional suitable dicarboxylic acids include substantially saturated acyclic, aliphatic dimer acids formed by the dimerization reaction of fatty acids having from 4 to 22 carbon atoms and a terminal carboxyl group (forming dimer acids having from 8 to 44 carbon atoms). Dimer acids are well known and commercially available, examples of which include the so-called "dimer acids" and "trimer acids" sold under the name EMPOL® by the Henkel Corporation, Emery Group, Cincinnati, Ohio.

As mentioned above, reactant (i) may also comprise epoxy group-containing acrylic polymers. These may be copolymers of one or more epoxy group-containing, ethylenically unsaturated monomers, or hydroxyl group-containing, ethylenically unsaturated monomers, and one or more alkyl esters of acrylic acid or methacrylic acid, optionally together with one or more other polymerizable ethylenically unsaturated monomers. These polymers may be either of the thermoplastic type or the thermosetting crosslinking type. Suitable epoxy group containing, ethylenically unsaturated monomers are those containing 1,2-epoxy groups and include glycidyl acrylate, glycidyl methacrylate and allyl glycidyl ether. Suitable hydroxyl group containing, ethylenically unsaturated monomers include hydroxyethyl acrylate, hydroxyethyl methacrylate, hydroxypropyl acrylate, and hydroxypropyl methacrylate. Also allyl alcohol or oxyalkylated monomers such as oxyalkylated acrylic and methacrylic acid may be used. Additionally, hydroxy monomers chain extended with caprolactone may also be used. Suitable alkyl esters of acrylic acid or methacrylic acid include methyl methacrylate, ethyl methacrylate, butyl methacrylate, ethyl acrylate, butyl acrylate, and 2-ethyl hexyl acrylate. Suitable other copolymerizable ethylenically unsaturated monomers include vinyl aromatic compounds such as styrene and vinyl toluene; nitriles such acrylonitrile and methacrylonitrile; vinyl and vinylidene halides such as vinyl chloride and vinylidene fluoride and vinyl esters such as vinyl acetate.

Reactant (i) may alternatively comprise hydroxyl group containing polyester polymers and oligomers. Suitable polyesters may be prepared in a known manner by reaction of polyhydric alcohols and polycarboxylic acids or anhydrides. Polyhydric alcohols that may be used to make such polyesters include ethylene glycol, propylene glycol, butylene glycol, 1,6-hexylene glycol, neopentyl glycol, diethylene glycol, glycerol, trimethylol propane, and pentaerythritol. Suitable polycarboxylic acids that may be used to make such polyesters include succinic acid, adipic acid, azelaic acid, sebacic acid, maleic acid, fumaric acid, phthalic acid, tetrahydrophthalic acid, hexahydrophthalic acid, and trimellitic acid. In addition to the polycarboxylic acids mentioned above, it would be understood by those of skill in the art that functional equivalents of the acids such as anhydrides (where they exist) or lower alkyl esters of the acids such as the methyl esters may be used to make the polyesters.

To make the adduct (a), the tartaric acid, malic acid, adipic acid, or succinic acid of reactant (ii) may be reacted with the polymer or oligomer containing terminal and/or pendant epoxy groups of reactant (i). The acid is typically provided in an amount ranging from about 5 to about 15 weight percent, preferably from about 7 to about 10 weight percent, based on weight of total resin solids. The reaction times and temperatures may be those that are known in the art for such reactions. Suitable reaction conditions may be, for example, at temperatures ranging from about 50 to 170° C., preferably from about 55 to 130° C. for about 1 hour to 8 hours.

Alternatively, the tartaric acid, malic acid, adipic acid, or succinic acid of reactant (ii) may be reacted with a polymer or oligomer of reactant (i) containing pendant and/or terminal hydroxyl groups. To enable such a reaction to take place at lower temperatures so as to avoid decarboxylation, it is preferred that the acid reactant (ii) in this alternative embodiment be in the form of the corresponding anhydride. The acid or anhydride is typically present in an amount ranging from about 5 to about 50 weight percent, preferably from about 10 to about 30 weight percent, based on weight of total resin solids. The reaction times and temperatures may be those that are known in the art for such reactions. When anhydrides are used, suitable reaction conditions may be, for example, at temperatures ranging from about 60 to 150° C., preferably from about 60 to 120° C. for about 1 hour to 8 hours. Higher temperatures may be required when using the acid form.

As described above, the dicarboxylic acids of reactant (ii) are reacted with a polymeric or oligomeric form of reactant (i). Alternatively, a carboxyl functional adduct can first be formed by reacting the acid of reactant (ii) with hydroxyl or epoxy group containing monomers which may then be polymerized. In particular, this may be used in place of those embodiments wherein reactant (i) is an acrylic polymer. In that case, the dicarboxylic acids of (ii) may be reacted with ethylenically unsaturated monomers, which are then polymerized under free radical polymerization conditions, optionally in the presence of other ethylenically unsaturated monomers, so as to form the carboxyl functional polymer (a). Likewise, a carboxyl functional adduct can be formed by reacting the acid with one of the epoxy group containing, ethylenically unsaturated monomers and then under free radical polymerization conditions, further reacting the adduct with at least one other ethylenically unsaturated monomer, such as those described above, to form the carboxyl functional polymer.

The curable coating composition of the invention additionally includes component (b) which comprises an anhydride group-containing curing agent that facilitates cure of the coating by reaction with the hydroxyl groups of component (a). The anhydride curing agent is a material containing at least two cyclic carboxylic acid anhydride groups in the molecule. Particularly useful are polymers having number average molecular weights between 1000 and 50,000, preferably between 2000 and 5000, where the molecular weights are determined by gel permeation chromatography using polystyrene standards.

Especially preferred curing agents are free radical addition polymers prepared by polymerizing a polymerizable, ethylenically unsaturated monomer having anhydride functionality such as maleic anhydride, citraconic anhydride, itaconic anhydride, propenyl succinic anhydride, etc. with other ethylenically unsaturated monomers. Examples of such ethylenically unsaturated materials include esters of acrylic and methacrylic acids such as methyl acrylate, methyl methacrylate, butyl acrylate, butyl methacrylate; vinyl compounds such as vinyl acetate and vinyl chloride; vinyl aromatic compounds such as styrene and alpha-methylstyrene; allyl compounds such as allyl chloride and allyl acetate and other copolymerizable ethylenically unsaturated monomers such as nitriles, to include acrylonitrile and methacrylonitrile; amides such as acrylamide and methacrylamide; and dienes such as 1,3-butadiene.

The carboxyl functional adduct is typically present in the curable coating compositions of invention in an amount ranging from about 10 to about 50 weight percent, preferably from about 15 to about 30 weight percent, and more preferably from about 20 to 25 weight percent based on weight of total resin solids. The anhydride functional curing agent is typically present in the coating composition of the invention in an amount ranging from about 25 to about 75 weight percent, preferably from about 25 to about 50 weight percent, and more preferably from about 30 to about 40 weight percent based on weight of total resin solids. When employed, the polyisocyanate is typically present in the curable coating composition of the invention in an amount ranging from about 1 to about 20 weight percent, preferably from about 2 to about 10 weight percent, and more preferably from about 2 to about 5 weight percent based on weight of total resin solids.

The coating composition of the present invention can also contain a number of optional conventional ingredients such as pigments, rheology control agents, flow control agents, corrosion inhibitive pigments, adhesion promoters, catalysts, cure retarders, and fillers. A solvent or a blend of solvents is generally utilized to reduce the coating composition to an optimum spray viscosity. Examples of suitable reducing solvents include acetone, methyl ethyl ketone, methyl isobutyl ketone, methyl amyl ketone, and butyl acetate. Preferably, a blend of solvents is used.

The coating compositions of the present invention are generally organic solvent based, but they may also be water based. An amine may be used to neutralize the carboxyl groups of the adduct to form an dispersion of the polymer in water. Useful amines include dialkanolamines, alkylalkanolamines, and arylalkanolamines containing from 2 to 18 carbon atoms in the alkanol, alkyl, and aryl chains. Specific examples include N-ethylethanolamine, N-methylethanolamine, diethanolamine, N-phenylethanolamine and diisopropanolamine.

The coating compositions of the present invention can be applied to a variety of substrates by any of the conventional coating application techniques such as brushing, spraying, dipping, or flow coating, but it is preferred that spray application be used since this generally provides optimum appearance. Any of the known spray techniques may be employed such as compressed air spraying and airless spraying, including manual and automatic methods. Also electrostatic spray techniques may be used. The coating composition is typically applied such that the dry film thickness of the coating is in the range of about 15 to 200 microns.

The coating compositions may be cured, preferably at ambient temperature, or at elevated temperatures ranging from about 40 to 170° C. for about 10 to 60 minutes.

Essentially complete cure can generally be achieved in about three to four hours at ambient conditions. For purposes of this invention, essentially complete cure is intended to mean the attainment of satisfactory performance properties even though the crosslinking reaction may not have reached completion.

The coating compositions of the present invention are particularly advantageous as primer coating compositions for automotive refinish applications. The compositions can be applied directly to bare metal surfaces and, after being allowed to cure and the finish prepared such as by sanding, coated directly with a pigmented topcoat composition or "color plus clear" topcoat system. The coating compositions of this invention may also be used as a pigmented topcoat composition or as the pigmented basecoat composition and/or clear topcoat composition in a "color plus clear" system.

The present invention also provides a coated article comprising a metallic substrate, such as cold-rolled steel and, preferably, zinc coated substrate, and a cured coating thereon, the cured coating being derived from the coating composition disclosed herein.

The invention will further be described by reference to the following examples which are presented for the purpose of illustration only and are not intended to limit the scope of the invention.

EXAMPLES

In Examples I through IV, the synthesis of carboxylic acid containing adducts are described, employing four different dicarboxylic acids. These adducts are incorporated into coating compositions in Examples 1 through 4, which were subjected to adhesion tests, the results of which are reported in Table I.

Example I

A tartaric acid terminated polyester was prepared from the following ingredients:

| INGREDIENT | AMOUNT (grams) |
| --- | --- |
| 1. EMPOL 1008[a] | 287.3 |
| 2. EPON 828[b] | 223.1 |
| 3. Xylene | 41.3 |
| 4. Monomethyl ether of propylene glycol[c] | 396.4 |
| 5. Ethyl triphenyl phosphonium iodide | 5.1 |
| 6. Tartaric acid | 31.5 |

[a]Dimer acid containing 94% of $C_{36}$ dibasic acid, 3% of $C_{54}$ polybasic acid and 3% monobasic acid having a molecular weight of about 590 commercially available from Henkel Corporation.
[b]Polyglycidyl ether of bisphenol A, commercially available from Shell Oil and Chemical Co.
[c]DOWANOL PM from Dow Chemical Co.

Ingredients 1 through 5 were added to a stirred reaction flask with a nitrogen sparge and heated to 120° C. The mixture was held at this temperature until the epoxy equivalent reached the range of 5100 to 5700. The reaction product was then cooled to 90° C. and ingredient 6 was added. The contents were held at this temperature until the acid value reached the range of 16 to 20. The final product had a solid contents of about 55weight percent.

Example II

A malic acid terminated polyester was prepared in the same way as in Example I by replacing tartaric acid with malic acid on an equivalent basis.

Example III

An adipic acid terminated polyester was prepared in the same way as in Example I by replacing tartaric acid with adipic acid on an equivalent basis.

Example IV

A succinic acid terminated polyester was prepared in the same way as in Example I by replacing tartaric acid with malic acid on an equivalent basis.

Examples 1–4, Coating Compositions

| Ingredients | Example 1 (Parts by Weight) | Example 2 (Parts by Weight) | Example 3 (Parts by Weight) | Example 4 (Parts by Weight) |
| --- | --- | --- | --- | --- |
| Grind Paste: | | | | |
| Acrylic polyol[1] | 10.7 | 10.7 | 10.7 | 10.7 |
| Butyl acetate | 9.4 | 9.4 | 9.4 | 9.4 |
| Ethyl acetate | 1.9 | 1.9 | 1.9 | 1.9 |
| Polyethylene wax solution[2] | 0.4 | 0.4 | 0.4 | 0.4 |
| Soya Lecithin[3] | 0.01 | 0.01 | 0.01 | 0.01 |
| BENTONE SD-2[4] | 0.4 | 0.4 | 0.4 | 0.4 |
| Carbon black[5] | 0.1 | 0.1 | 0.1 | 0.1 |
| Fumed silica[6] | 0.5 | 0.5 | 0.5 | 0.5 |
| Talc[7] | 7.0 | 7.0 | 7.0 | 7.0 |
| Titanium dioxide[8] | 5.3 | 5.3 | 5.3 | 5.3 |
| Zinc orthophosphate[9] | 2.9 | 2.9 | 2.9 | 2.9 |
| Hydrated iron oxide[10] | 1.1 | 1.1 | 1.1 | 1.1 |
| Calcium carbonate[11] | 7.0 | 7.0 | 7.0 | 7.0 |
| Xylene | 5.3 | 5.3 | 5.3 | 5.3 |
| Acetone | 0.7 | 0.7 | 0.7 | 0.7 |
| Butyl benzyl phthalate[12] | 1.3 | 1.3 | 1.3 | 1.3 |
| Toluene | 3.6 | 3.6 | 3.6 | 3.6 |
| Vinyl chloride acetate[13] | 0.6 | 0.6 | 0.6 | 0.6 |
| Ethyltriphenyl-phosphonium acetate[14] | 0.1 | 0.1 | 0.1 | 0.1 |
| Resin: | | | | |
| Tartaric acid polymer of Example I | 9.7 | — | — | — |
| Malic acid polymer of Example II | — | 9.7 | — | — |
| Adipic acid polymer of Example III | — | — | 9.7 | — |
| Succinic acid polymer of Example IV | — | — | — | 9.7 |
| Methyl isobutyl ketone | 8.8 | 8.8 | 8.8 | 8.8 |
| Hardener: | | | | |
| Polyurethane polyanhydride[15] | 15.8 | 15.8 | 15.8 | 15.8 |
| Methyl isobutyl ketone | 8.4 | 8.4 | 8.4 | 8.4 |

[1]Acrylic polyol containing 23 weight percent styrene, 21.4 weight percent diethylaminoethyl methacrylate, 18.8 weight percent methyl methacrylate, 17.9 weight percent hydroxyethyl acrylate, 9.2 weight percent 2-ethylhexyl acrylate, 9.2 weight percent 2-ethylhexyl methacrylate, and 0.5 weight percent TONE M-100 (adduct of caprolactone and acrylic acid commercially available from Union Carbide, Inc.).
[2]AC-629 polyethylene wax available from Allied Signal reduced to 20 weight percent in xylene.
[3]Bleached soya lecithin available from American Lecithin.
[4]Organophilic clay available from Rheox.
[5]Commercially available from Phelps Dodge, Inc. as RAVEN ® 410.
[6]Fumed silica commercially available from PPG Industries, Inc. as LOVEL ® 27.
[7]Magnesium silicate available from Barretts Minerals.
[8]Commercially available from E. I. du Pont de Nemours and Co. as R-960-38.
[9]Commercially available from Heubach as ZINC PHOSPHATE ZP 20.
[10]Commercially available from Bayer Corp. as 130M.
[11]Commercially available from Georgia Marble.
[12]Commercially available from Solutia, Inc.
[13]Commercially available from Union Carbide, Inc.
[14]Commercially available from Morton Chemicals.

-continued

| Ingredients | Example 1 (Parts by Weight) | Example 2 (Parts by Weight) | Example 3 (Parts by Weight) | Example 4 (Parts by Weight) |
|---|---|---|---|---|

[15]Polyurethane based anhydride consisting of 55 weight percent isophorone diisocyanate, 26 weight percent hydroxy propyl sorbate, 5 weight percent 1,6-hexanediol, 14 weight percent maleic anhydride as described in U.S. PAT. NO. 5,059,655.

The grind paste was prepared by combining the ingredients in a suitable vessel under high speed agitation using a Cowles blade. Agitation was continued at a high speed for 30 minutes until a fineness of 5 to 5.5 on the Hegman scale was obtained. At this time, the acid modified polyepoxide polymer and methyl isobutyl ketone were added and mixed with the grind paste under agitation. The polyanhydride hardener was added just prior to spray application.

Each test panel was sanded with 80 grit sandpaper prior to primer application, then wiped with DX-330, an aliphatic solvent blend containing oleic acid commercially available from PPG Industries, Inc. The primer compositions were spray applied directly onto each test panel panel (cold rolled steel and electrogalvanized steel) to a dry film thickness of 2.0 to 4.0 mils and cured for 60 to 90 minutes at ambient temperature. No chrome wash primer was used prior to application of the primer compositions of the examples.

The primed panels were subsequently wet-sanded with 360 grit sandpaper by hand. A color coat, DBU-9700 base coat, commercially available from PPG Industries, Inc., was then applied onto the sanded primer to a film thickness of about 0.2 to about 0.4 mils and cured for 45 to 60 minutes at ambient temperature. The color coated panels were then topcoated with DCU-2001/DFX-7 clear coat, commercially available from PPG Industries, Inc., to a film thickness of 2.0 to 3.0 mils and allowed to cure for 96 to 168 hours at ambient temperature prior to testing.

Cross-hatch adhesion was evaluated both before and after 96 hours of humidity exposure (110° F. and 100% relative humidity) whereby the coating was scribed with eleven parallel cuts through the film, 1 millimeter apart, using a Gardner Cross Cut Tester Model P-A-T, fitted with a PA-2056 blade (both available from Gardco, Pompano Beach, Florida). Eleven similar cuts were made at 90 degrees and crossing the first eleven cuts. Permacel 99 tape was applied over the cuts by pressing down firmly against the coating to eliminate voids and air pockets. The tape was then sharply pulled off at a 180 degree angle to the plane of the coated surface. Adhesion was rated on a graduated scale of 0 to 5 (with 0 representing complete loss of adhesion and 5 representing no loss of adhesion). The test panels were also evaluated for blistering after the 96 hours of humidity exposure. The results are reported in the following Table I.

TABLE I

| Primer | Substrate | Adhesion | | Humidity |
| | | Dry | Humidity | Blistering |
|---|---|---|---|---|
| Control* | Cold Rolled | 3 | 1 | None |
| Control* | Electrogalvanized | 2 | 1 | None |
| Example 1 | Cold Rolled | 5 | 4 | None |
| Example 1 | Electrogalvanized | 4 | 4 | None |
| Example 2 | Cold Rolled | 4 | 0 | None |
| Example 2 | Electrogalvanized | 4 | 3 | None |
| Example 3 | Cold Rolled | 4 | 3 | None |
| Example 3 | Electrogalvanized | 4 | 2 | None |
| Example 4 | Cold Rolled | 4 | 2 | None |
| Example 4 | Electrogalvanized | 4 | 3 | None |

*An analogous set of test panels were coated with NCT-250/NCX-255, a commercial automotive refinish primer (which utilizes hydroxyl-anhydride cure) available from PPG Industries, Inc., and topcoated as described above for Examples 1 through 4.

The data reported in Table I illustrates that the primer compositions of Examples 1, 2, 3, and 4 are superior to an analogous anhydride-cured commercial refinish primer for adhesion to electrogalvanized steel substrates. Examples 1, 3, and 4 were also superior for adhesion to cold rolled steel. Example 1 (tartaric acid adduct) exhibited superior overall adhesion performance.

What is claimed is:

1. A curable coating composition comprising:
   (a) an adduct having carboxyl and hydroxyl groups comprising the reaction product of:
      (i) a compound or polymer containing pendant and/or terminal hydroxyl or epoxy groups; and
      (ii) a material selected from the group consisting of tartaric acid, malic acid, adipic acid, and combinations thereof;
      wherein the carboxyl functionality of the adduct is in a terminal and/or pendant position and is derived from the reaction of the hydroxyl groups and/or the epoxy groups with the acids of (ii); and
   (b) an anhydride curing agent.

2. The curable coating composition of claim 1 wherein material (ii) comprises tartaric acid.

3. The curable coating composition of claim 1 wherein reactant (i) is an acrylic polymer containing pendant and/or terminal hydroxyl or epoxy functional groups.

4. The curable coating composition of claim 1 wherein reactant (i) is a polyester polymer containing pendant and/or terminal hydroxyl or epoxy functional groups.

5. The curable coating composition of claim 1 wherein reactant (i) is a reaction product of a polyglycidyl ether of a cyclic polyol and a dicarboxylic acid, the reaction product (i) containing pendant and/or terminal epoxy groups.

6. The curable coating composition of claim 5 wherein the dicarboxylic acid reacted with reactant (i) is a fatty acid dimer having at least 8 carbon atoms.

7. The curable coating composition of claim 1 further comprising at least one pigment.

* * * * *